(12) United States Patent  
Bouguerra et al.

(10) Patent No.: US 12,556,501 B2  
(45) Date of Patent: Feb. 17, 2026

(54) SYSTEMS AND METHODS FOR INSTRUCTIONS BASED MESSAGING INBOX USING A LANGUAGE MODEL

(71) Applicant: YAHOO ASSETS LLC, New York, NY (US)

(72) Inventors: Bassem Bouguerra, Long Beach, CA (US); Kyle Garrett Miller, Encinitas, CA (US)

(73) Assignee: YAHOO ASSETS LLC, New York, NY (US)

(*) Notice: Subject to any disclaimer, the term of this patent is extended or adjusted under 35 U.S.C. 154(b) by 156 days.

(21) Appl. No.: 18/474,354

(22) Filed: Sep. 26, 2023

(65) Prior Publication Data

US 2025/0106177 A1   Mar. 27, 2025

(51) Int. Cl.
| | |
|---|---|
| *G06F 40/47* | (2020.01) |
| *G06F 3/0481* | (2022.01) |
| *G06F 3/0484* | (2022.01) |
| *H04L 51/07* | (2022.01) |

(52) U.S. Cl.
CPC ............ *H04L 51/07* (2022.05); *G06F 3/0481* (2013.01); *G06F 3/0484* (2013.01); *G06F 40/47* (2020.01)

(58) Field of Classification Search
CPC ....... H04L 51/07; G06F 40/47; G06F 3/0481; G06F 3/0484
See application file for complete search history.

(56) References Cited

U.S. PATENT DOCUMENTS

| | | | |
|---|---|---|---|
| 12,010,076 B1* | 6/2024 | Andrew | .................. H04L 51/02 |
| 2010/0107123 A1* | 4/2010 | Sareen | .................. G06F 3/0481 |
| | | | 715/835 |
| 2018/0052824 A1* | 2/2018 | Ferrydiansyah | ....... G06N 20/00 |
| 2018/0337958 A1* | 11/2018 | Nagarkar | ............ H04L 63/0227 |

OTHER PUBLICATIONS

Gaurav Kumar Rajput et al., The Way to Make Blind People Use the Email System: Voice Based Email Generating System Using Artificial Intelligence, Jan. 27, 2023, International Conference on Artificial Intelligence and Smart Communication, pp. 1120-1123 (Year: 2023).*

Vindhya Vasini K et al., A Natural Language Processing based Intelligent Bot Application, Apr. 7, 2022, International Conference on Sustainable Computing and Data Communication Systems, pp. 1-6 (Year: 2022).*

* cited by examiner

*Primary Examiner* — Tam T Tran
(74) *Attorney, Agent, or Firm* — Bookoff McAndrews, PLLC

(57) ABSTRACT

Various embodiments of this disclosure relate generally to utilizing a machine-learning model to process natural language email instructions. The method comprises receiving, by one or more processors, at least one instruction from a user via an email interface displayed on a user device, the email interface corresponding to an email application, processing, by a trained machine-learning model, the at least one instruction to determine at least one response, wherein processing the at least one instruction includes applying at least one persona of the user to the at least one instruction, performing, by the one or more processors, at least one action or at least one query corresponding to the at least one response, and displaying, by the one or more processors, a confirmation on the email interface of the user device that the at least one response was completed.

20 Claims, 3 Drawing Sheets

SYSTEMS AND METHODS FOR INSTRUCTIONS BASED MESSAGING INBOX USING A LANGUAGE MODEL

TECHNICAL FIELD

Various embodiments of this disclosure relate generally to systems and methods for training and utilizing a machine-learning model to process natural language email instructions.

BACKGROUND

Email usage is an integral method of communication for many people. However, since email usage has become incredibly popular, many people's email applications have an overwhelming amount of emails. As a result, for many users, navigating the email application user interface, tools, and features can be an intimidating experience. For example, users may experience email overload by loading many junk emails by default when opening the email application. Moreover, personalization of the email application is currently limited and may demand significant manual effort. Conventional methods for improving a user's email application experience may include the user manually filtering and sorting through email. However, such conventional methods are inefficient and limited in scope. Additionally, such conventional methods may not provide a personalized experience, such as personalized options or suggestions, to the user. As a result, improvements for personalizing and enhancing a user's email experience are desired, so as to improve efficiency and the overall user email experience.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, embodiments are disclosed for utilizing a machine-learning model to process natural language email instructions.

In one aspect, an exemplary embodiment of a method for utilizing a machine-learning model to process natural language email instructions is disclosed. The method may include receiving, by one or more processors, at least one instruction from a user via an email interface displayed on a user device, the email interface corresponding to an email application. The method may further include processing, by a trained machine-learning model, the at least one instruction to determine at least one response, wherein processing the at least one instruction includes applying at least one persona of the user to the at least one instruction. The method may further include performing, by the one or more processors, at least one action or at least one query corresponding to the at least one response. The method may further include displaying, by the one or more processors, a confirmation on the email interface of the user device that the at least one response was completed.

In one aspect, a computer system for utilizing a machine-learning model to process natural language email instructions is disclosed. The computer system may comprise a memory having processor-readable instructions stored therein and one or more processors configured to access the memory and execute the processor-readable instructions, which when executed by the one or more processors configures the one or more processors to perform a plurality of functions. The functions may comprise receiving at least one instruction from a user via an email interface displayed on a user device, the email interface corresponding to an email application. The functions may further comprise processing, by a trained machine-learning model, the at least one instruction to determine at least one response, wherein processing the at least one instruction includes applying at least one persona of the user to the at least one instruction. The functions may further comprise performing at least one action or at least one query corresponding to the at least one response. The functions may further comprise displaying a confirmation on the email interface of the user device that the at least one response was completed.

In one aspect, a non-transitory computer-readable medium containing instructions for utilizing a machine-learning model to process natural language email instructions is disclosed. The instructions may comprise receiving at least one instruction from a user via an email interface displayed on a user device, the email interface corresponding to an email application. The instructions may further comprise processing, by a trained machine-learning model, the at least one instruction to determine at least one response, wherein processing the at least one instruction includes applying at least one persona of the user to the at least one instruction. The instructions may further comprise performing at least one action or at least one query corresponding to the at least one response. The instructions may further comprise displaying a confirmation on the email interface of the user device that the at least one response was completed.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
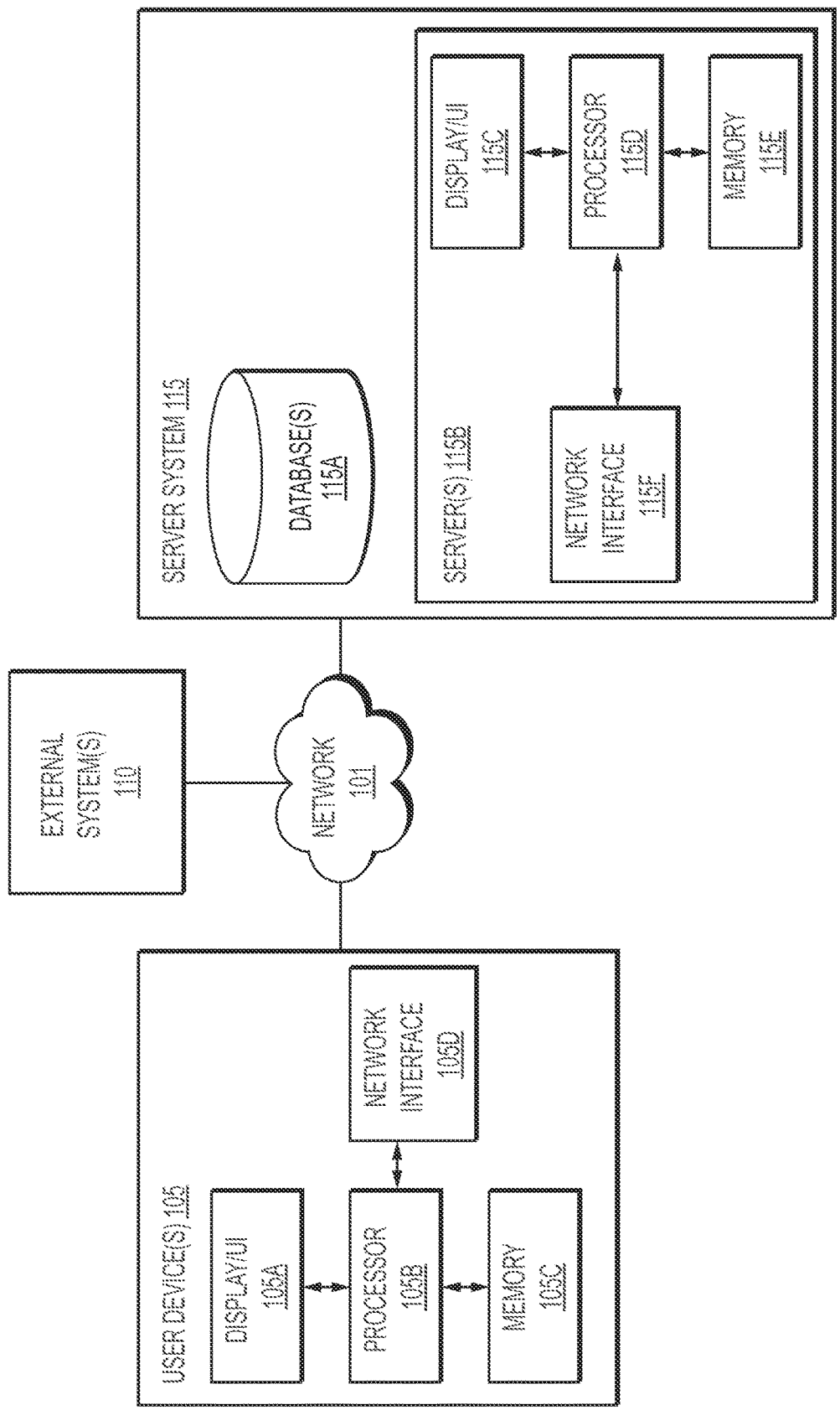
FIG. 1 depicts an exemplary networked computing environment that may be utilized with techniques presented herein, according to one or more embodiments.

According to certain aspects of the disclosure, methods and systems for utilizing a machine-learning model to process natural language email instructions are disclosed.

Email usage is an integral method of communication for many people. However, since email usage has become incredibly popular, many people's email applications have an overwhelming amount of emails. As a result, for many users, navigating the email application user interface, tools, and features can be an intimidating experience. For example, users may experience email overload by loading many junk emails by default when opening the email application. Moreover, personalization of the email application is currently limited and may demand significant manual effort. Conventional methods for improving a user's email application experience may include the user manually filtering and sorting through email. However, such conventional methods are inefficient and limited in scope. Additionally, such conventional methods may not provide a personalized experience, such as personalized options or suggestions, to the user. As a result, improvements for personalizing and enhancing a user's email experience are desired, so as to improve efficiency and the overall user email experience.

The present disclosure describes systems and methods for training and utilizing a machine-learning model to process natural language email instructions. In particular, when applied to email applications, the presently disclosed systems and methods may leverage machine-learning models to optimize users' interactions with the email application. For example, the approach may include utilizing machine-learning models to determine a persona of a user, which may describe how the user interacts with the email application, as well as using the persona of the user to provide context regarding how to respond to a user's instruction.

As will be discussed in more detail below, in various embodiments, systems and methods are described for utilizing a machine-learning model to process natural language email instructions. The systems and methods may include receiving, by one or more processors, at least one instruction from a user via an email interface displayed on a user device, the email interface corresponding to an email application. The systems and methods may include processing, by a trained machine-learning model, the at least one instruction to determine at least one response, wherein processing the at least one instruction includes applying at least one persona of the user to the at least one instruction. The systems and methods may include performing, by the one or more processors, at least one action or at least one query corresponding to the at least one response. The systems and methods may include displaying, by the one or more processors, a confirmation on the email interface of the user device that the at least one response was completed.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In the detailed description herein, references to "embodiment," "an embodiment," "one non-limiting embodiment," "in various embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In general, terminology can be understood at least in part from usage in context. For example, terms, such as "and", "or", or "and/or," as used herein can include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal." As used herein, the singular forms "a," "an," and "the" include plural reference unless the context dictates otherwise. Relative terms such as "about," "substantially," and "approximately" refer to being nearly the same as a referenced number or value, and should be understood to encompass a variation of +5% of a specified amount or value.

As used herein, a "model" or "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. Any suitable type of training may be used, e.g., stochastic, gradient boosted, random seeded, recursive, epoch or batch-based, etc.

Certain non-limiting embodiments are described below with reference to block diagrams and operational illustrations of methods, processes, devices, and apparatus. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

Exemplary Environment

FIG. 1 depicts an exemplary environment 100 that may be utilized with techniques presented herein. One or more user device(s) 105, one or more external system(s) 110, and one or more server system(s) 115 may communicate across a network 101. As will be discussed in further detail below, one or more server system(s) 115 may communicate with one or more of the other components of the environment 100 across network 101. The one or more user device(s) 105 may be associated with a user, e.g., a user associated with one or more of generating, training, or tuning a machine-learning model for processing natural language email instructions.

In some embodiments, the components of the environment 100 are associated with a common entity. In some embodiments, one or more of the components of the environment is associated with a different entity than another. The systems and devices of the environment 100 may communicate in any arrangement. As will be discussed herein, systems and/or devices of the environment 100 may communicate in order to one or more of generate, train, and/or use a machine-learning model to process natural language email instructions, among other activities.

The user device 105 may be configured to enable the user to access and/or interact with other systems in the environment 100. For example, the user device 105 may be a computer system such as, for example, a desktop computer, a mobile device, a tablet, etc. In some embodiments, the user device 105 may include one or more electronic application(s), e.g., a program, plugin, browser extension, etc., installed on a memory of the user device 105.

The user device 105 may include a display/user interface (UI) 105A, a processor 105B, a memory 105C, and/or a network interface 105D. The user device 105 may execute, by the processor 105B, an operating system (O/S) and at least one electronic application (each stored in memory 105C). The electronic application may be a desktop program, a browser program, a web client, or a mobile application program (which may also be a browser program in a mobile O/S), an applicant specific program, system control software, system monitoring software, software development tools, or the like. For example, environment 100 may extend information on a web client that may be accessed through a web browser. In some embodiments, the electronic application(s) may be associated with one or more of the other components in the environment 100. The application may manage the memory 105C, such as a database, to transmit streaming data to network 101. The display/UI 105A may be a touch screen or a display with other input systems (e.g., mouse, keyboard, etc.) so that the user(s) may interact with the application and/or the O/S. The network interface 105D may be a TCP/IP network interface for, e.g., Ethernet or wireless communications with the network 101. The processor 105B, while executing the application, may generate data and/or receive user inputs from the display/UI 105A and/or receive/transmit messages to the server system 115, and may further perform one or more operations prior to providing an output to the network 101.

External systems 110 may be, for example, one or more third party and/or auxiliary systems that integrate and/or communicate with the server system 115 in performing various natural language email instruction tasks. External systems 110 may be in communication with other device(s) or system(s) in the environment 100 over the one or more networks 101. For example, external systems 110 may communicate with the server system 115 via API (application programming interface) access over the one or more networks 101, and also communicate with the user device(s) 105 via web browser access over the one or more networks 101.

In various embodiments, the network 101 may be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The server system 115 may include an electronic data system, e.g., a computer-readable memory such as a hard drive, flash drive, disk, etc. In some embodiments, the server system 115 includes and/or interacts with an application programming interface for exchanging data to other systems, e.g., one or more of the other components of the environment.

The server system 115 may include a database 115A and at least one server 115B. The server system 115 may be a computer, system of computers (e.g., rack server(s)), and/or or a cloud service computer system. The server system may store or have access to database 115A (e.g., hosted on a third party server or in memory 115E). The server(s) may include a display/UI 115C, a processor 115D, a memory 115E, and/or a network interface 115F. The display/UI 115C may be a touch screen or a display with other input systems (e.g., mouse, keyboard, etc.) for an operator of the server 115B to control the functions of the server 115B. The server system 115 may execute, by the processor 115D, an operating system (O/S) and at least one instance of a servlet program (each stored in memory 115E).

The server system 115 may generate, store, train, or use a machine-learning model, configured to process natural language email instructions. The server system 115 may include a machine-learning model and/or instructions associated with the machine-learning model, e.g., instructions for generating a machine-learning model, training the machine-learning model, using the machine-learning model, etc. The server system 115 may include instructions for processing natural language email instructions, e.g., based on the output of the machine-learning model, and/or operating the display 115C to output an action, e.g., as adjusted based on the machine-learning model. The server system 115 may include training data, e.g., one or more email datasets, one or more inbox characteristics, and/or at least one persona.

In some embodiments, a system or device other than the server system 115 is used to generate and/or train the machine-learning model. For example, such a system may include instructions for generating the machine-learning model, the training data and ground truth, and/or instructions for training the machine-learning model. A resulting trained machine-learning model may then be provided to the server system 115.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between email interfaces, email datasets, inbox characteristics, personas, and actions, such that the trained machine-learning model is configured to determine a persona and/or an action in response to the input email datasets and inbox characteristics based on the learned associations.

In various embodiments, the variables of a machine-learning model may be interrelated in any suitable arrangement in order to generate the output. For example, the machine-learning model may include one or more convolutional neural network ("CNN") configured to identify persona associations, and may include further architecture, e.g., a connected layer, neural network, etc., configured to determine a relationship between the identified features in order to determine a persona and/or an action.

Further aspects of the machine-learning model and/or how it may be utilized to process natural language email queries in further detail in the method below. In the following methods, various acts may be described as performed or executed by a component from FIG. 1, such as the server system 115, the user device 105, or components thereof. However, it should be understood that in various embodiments, various components of the environment 100 discussed below may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
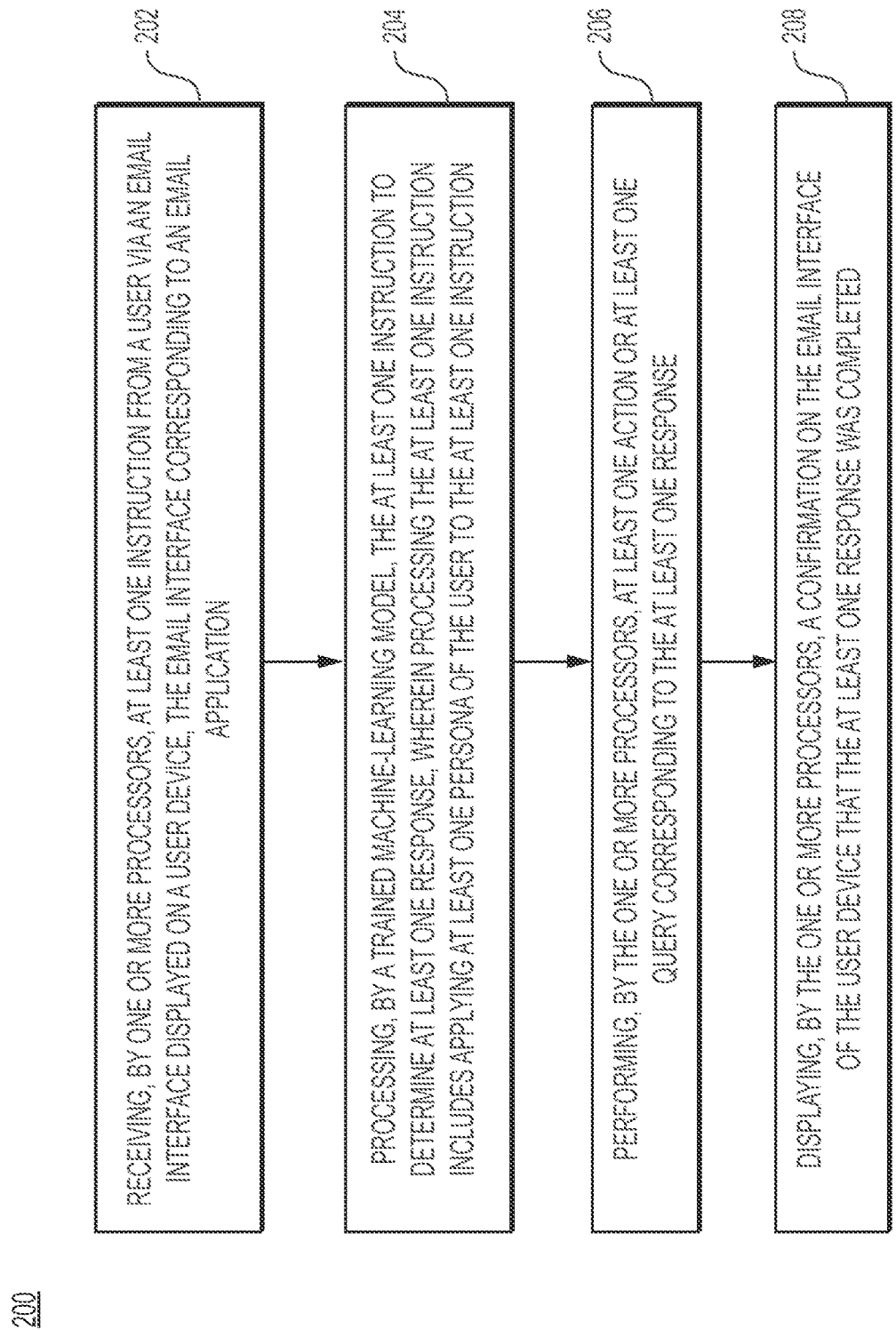
FIG. 2 depicts a flowchart of an exemplary method for utilizing a machine-learning model to process natural language email instructions, according to one or more embodiments.

In general, any process or operation discussed in this disclosure that is understood to be computer-implementable, such as the process illustrated in FIG. 2, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples below, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Although depicted as separate components in FIG. 1, it should be understood that a component or portion of a component in the environment 100 may, in some embodiments, be integrated with or incorporated into one or more other components. For example, a portion of the display 115C may be integrated into the user device 105 or the like. In some embodiments, operations or aspects of one or more of the components discussed above may be distributed amongst one or more other components. Any suitable arrangement and/or integration of the various systems and devices of the environment 100 may be used.

Exemplary Method for Processing Natural Language Email Queries

FIG. 2 depicts a flowchart of an exemplary method 200 for utilizing a machine-learning model to process natural language email instructions, according to one or more embodiments. Method 200 may be performed by one or more processors of a server that is in communication with one or more user devices and other external system(s) via a network. However, it should be noted that method 200 may be performed by any one or more of the server, one or more user devices, or other external systems.

The method may include receiving, by one or more processors, at least one instruction from a user via an email interface displayed on a user device, the email interface corresponding to an email application (Step 202). The email interface may include components of an email application. For example, the email interface may include an email inbox, an email outbox, one or more email folders, one or more email exchanges, and the like. A user device, such as a cell phone, laptop, desktop, and the like may display the email interface. A user may submit an instruction via the email interface. For example, the user interface may include a prompt for the user to input the instruction. Exemplary prompts may include a text box, a virtual assistant, and the like. The instruction may include a query for information and/or a command. The query for information may include a request to display emails related to a particular topic (e.g., "show me all emails related to my Paris trip"), a request to display emails from a particular date (e.g., "show me all emails from Thursday"), a request to display specific email exchanges (e.g., "show me all emails with John Smith"), and the like. The command may include instructions for moving emails, filtering emails, organizing emails and/or folders, deleting emails, and the like. For example, the command may state "create a folder, name it 'Paris Trip,' and put all Paris related trip emails in the folder, and make sure that all incoming emails are routed to the folder." The at least one instruction may include at least one natural language query, where the user may input the instruction using natural language.

In some embodiments, the at least one instruction may include at least one of: a viewing action, an organizing action, a cleaning action, or a custom action. The viewing action may include a request to view specific emails. For example, a viewing action may include "create a folder and put in it all emails related to my next trip to Italy." The organizing action may include a request to organize one or more emails. For example, an organizing action may include "create a folder and put in it all emails related to my next trip to Italy." The cleaning action may include a request to delete or achieve particular emails. For example, a cleaning action may include "archive all emails from social networks." The custom action may include a request to personalize the email interface. For example, a custom action may include "change my inbox theme to a darker theme," or "start sending a professional auto-response from now until next Sunday."

The method may further include processing, by a trained machine-learning model, the at least one instruction to determine at least one response, wherein processing the at least one instruction includes applying at least one persona of the user to the at least one instruction (Step 204).

As discussed in the following section, a machine-learning model may have been previously trained to determine at least one persona corresponding to the user. The machine-learning model may receive one or more datasets and/or one or more inbox characteristics corresponding to the email application. The datasets may include information corresponding to the user's email application. For example, the datasets may include email application snapshots that include data such as, email exchanges, folders, email search history, and the like. The email exchanges may include one or more email conversations. The email exchanges may include a sender, a receiver, a time stamp, a subject, email text, and the like. The folders may include one or more email folders that may include email exchanges. The email search history may include one or more search queries performed by the user.

Additionally, or alternatively, the trained machine-learning model may receive one or more inbox characteristics. For example, the inbox characteristics may include at least one marked email, at least one email flag, at least one email amount, at least one inbox setting, or at least one inbox rule. The marked email may include an urgent marking and/or a starred marking on an email exchange. The email flag may include a flag to follow-up on an email. The email amount may include a number of emails in a folder and/or an email inbox. The inbox setting may correspond to a unique user setting and/or user preference of the email interface. Exemplary unique user settings and/or user preferences may include unique display settings, reminders, alerts, and the like. The inbox rule may include a filtering/organization rule for emails. For example, an inbox rule may include deleting new emails from a particular sender.

Based on the datasets and/or the inbox characteristics, the trained machine-learning model may determine at least one persona corresponding to the user. The trained machine-learning model may use the input, as well as previously learned associations, to determine the at least one persona. For example, the previously learned associations may include associations made between datasets and/or inbox characteristics and at least one persona of a user.

Additionally, or alternatively, the at least one persona may have been previously assigned to the user. In some embodiments, after the persona has been determined for the user, the system may store the persona for future analysis. The system may store the persona with a reference to the user (e.g., a unique user identifier) in one or more data stores. The method may further include receiving, by the trained machine-learning model, the at least one previously assigned persona from one or more data stores. The system may retrieve the at least one previously assigned persona from one or more data stores, and then input the at least one previously assigned persona into the trained machine-learning model for further analysis.

The persona may describe a user's personal style regarding how the user interacts with the email application. The at least one persona may include at least one of: an inbox organizer persona, a minimalist persona, a priority focused persona, a selective reader persona, a delayed responder persona, a batch processor persona, a social engager persona, an inbox ignorer persona, an information hoarder persona, or an unsubscriber persona. The inbox organizer persona may correspond to users who are meticulous about keeping their email inbox organized. The users may also categorize emails into folders, use labels and tags, and prioritize tasks based on received emails. The users may also read and respond to every email, keeping their inbox clean and well-maintained. The minimalist persona may correspond to users who prefer to keep their inbox as empty as possible. The users may delete or archive emails immediately after reading them, aiming to maintain a clutter-free inbox. The users may focus on essential communication and swiftly eliminate any email that is not immediately relevant. The priority focused persona may correspond to users who place a strong emphasis on emails that are directly related to their current tasks and projects. The users may quickly scan through their inbox, addressing on the most important messages while letting less relevant ones accumulate. The selective reader persona may correspond to users who only engage with emails that catch their attention in the subject line or sender preview. The users might skim through the inbox, only opening and responding to emails that pique their interest. This approach may help the users save time, but could also lead to missing some important messages. The delayed responder may correspond to users who read their emails regularly, but often take their time to respond. They might flag emails for follow-up and have a dedicated time for responding to accumulated messages. The users may come across as slow in response, but often provide well-thought-out replies. The batch processor persona may correspond to users who designate specific times during the day to deal with emails. The users may not constantly check their inbox, but may rather set aside dedicated blocks of time to read, respond, and manage their messages efficiently. The social engager persona may correspond to users who treat their email as a social platform. The users may engage in lengthy conversations through email, using it as a primary means of communication, similar to how some people use messaging apps or social media platforms. The inbox ignorer persona may correspond to users who tend to ignore their inbox altogether. The users may rely on other means of communication, or have an assistant or colleague who sorts and filters important emails for them. The users may check their inbox sporadically or rarely. The information hoarder persona may correspond to users who never delete emails. The users may archive and store every email, creating an extensive digital record. This persona may often rely on powerful search capabilities to find specific information when needed. The unsubscriber persona may correspond to users who actively manage their inbox by unsubscribing from mailing lists and promotional emails. The users may aim to reduce clutter and only receive messages they find directly relevant.

After determining the at least one persona, the trained machine-learning model may determine at least one response to the at least one instruction. The trained machine-learning model may apply the at least one persona to the at least one instruction, which may result in a response that is based on the context of the user. For example, the user may give an instruction stating "set reminders to respond to important emails." If the user has a batch processor persona, the system may set reminders that alert the user in small batches, as the batch processor persona may correspond to users who designate specific times during the day to deal with emails.

The response may include an action, a query for information, and the like. The action may correspond to an update to the email application, an update to the email interface, utilizing one or more email tools, and the like. The query for information may correspond to sending one or more queries to one or more databases that store the email application information. For example, the user may instruct the system to create a new folder called "Paris," and then move all emails related to a Paris trip into the "Paris" folder. In response to the instruction, the response may include updating the email application to include a new "Paris" folder. Additionally, the response may also include querying the one or more databases that store the user's email exchanges to determine the email exchanges that relate to Paris, as well as updating the email application by moving the one or more email exchanges that relate to Paris to the "Paris" folder. By way of another example, the user may instruct the system to "change the inbox colors to a night setting." In response to the instruction, the system may update the email interface by changing the colors of the email interface to a night setting. The email tools may include follow-up reminders, email flags, calendar appointments, and the like. For example, the user may instruct the system to "set calendar appointments for all trips." The system may query the one or more databases that store the user's email exchanges related to flight itineraries, hotel reservations, and/or car rentals. The system may then set calendar appointments for the flight itineraries, hotel reservations, and/or car rentals.

The method may further include performing, by the one or more processors, at least one action or at least one query corresponding to the at least one response (Step 206). In some embodiments, the system may display a prompt requesting that the user confirm the at least one action or the at least one query before the system performs the action or query. Upon receiving a confirmation from the user, the system may proceed with carrying out the action or query. Additionally, or alternatively, the system may automatically perform the action or query. Additionally, or alternatively, the system may prompt the user to confirm some, but not all, of the actions or queries.

The method may further include displaying, by the one or more processors, a confirmation on the email interface of the user device that the at least one response was completed (Step 208). The confirmation may include an acknowledgment that the instruction was carried out. In some embodiments, the confirmation may include details regarding the response that were carried out by the system. For example, the confirmation may include details regarding the at least one action. In some embodiments, the confirmation may include a user feedback widget for the user to provide feedback regarding whether the instruction was carried out correctly.

In some embodiments, the method may further include displaying, by the one or more processors, a user feedback widget on the email interface. The user feedback widget may include feedback options configured to receive feedback from the user. For example, the user feedback widget may include a thumbs up button and/or a thumbs down button. The user may select the thumbs up button to indicate the user's approval of the actions that were performed by the system. Alternatively, the user may select the thumbs down button to indicate the user's disapproval of the actions that were performed by the system. Additionally, or alternatively, the user feedback widget may include a text box for accepting one or more comments provided by the user. The comments may be provided by text and/or shorthand. The method may further include receiving, by the one or more processors, user feedback via the user feedback widget, wherein the user feedback includes a positive feedback indicator, a negative feedback indicator, or a comment. For example, the system may receive the selection of the thumbs up button or the thumbs down button. Additionally, or alternatively, the system may receive the comments input into the text box. The method may further include retraining, by the one or more processors, the trained machine-learning model based on the user feedback. The system may use the user feedback to tune the trained machine-learning model. For example, the system may receive the selection of the thumbs down button, which indicates that the system did not perform the action correctly. The trained machine-learning model may be tuned using the feedback, where the trained machine-learning model may identify and modify previously learned relationships based on the feedback.

In some embodiments, the method may further include analyzing, by the one or more processors, the at least one instruction to determine if the at least one instruction meets or surpasses a severity threshold, wherein the severity threshold includes one or more rules corresponding to an impact of the at least one instruction. The severity threshold may correspond to a threshold that determines whether the instruction, when carried out, would have a severe impact on the email application and/or the user's experience with the email application. For example, a user's instruction to delete all email exchanges may surpass the severity threshold, as deleting all email exchanges would have a grave impact. However, deleting a single email exchange may not meet or surpass the severity threshold. The severity threshold may have been previously set by a user or the system. Additionally, or alternatively, the severity threshold may have default values. In some embodiments, the severity threshold may include one or more rules. For example, a rule may state that an instruction that results in a permanent change to the user's email application meets the severity threshold. For example, an instruction to delete the user's account may meet such a rule.

The method may further include, in response to determining that the at least one instruction meets or surpasses the severity threshold, capturing, by the one or more processors, a snapshot of the email application. The snapshot may include current data that represents the current state of the email application. For example, the snapshot may include email exchanges, locations (e.g., folders) of such email exchanges, user preferences at the time of the snapshot, and the like. In some embodiments, the snapshot may only include data of part of the user's email application. For example, the instruction may include a command to delete all emails in the user's inbox. Such an instruction may meet the severity threshold. As a result, the system may capture a snapshot of the user's inbox, where the snapshot may include data of the user's inbox (e.g., email exchanges, time stamps, and the like). The system may also capture a timestamp of when the snapshot was taken, where the timestamp may include a date and/or a time of when the snapshot was captured.

The method may further include storing, by the one or more processors, the snapshot and a corresponding timestamp in one or more databases. The one or more databases may be a part of an internal system and/or an external system. In some embodiments, the method may also include storing an expiration timestamp, where the expiration timestamp corresponds to a date and/or a time that the snapshot may be removed (e.g., expire) from the one or more databases.

In some embodiments, the method may further include receiving, by the one or more processors, a reversion instruction to revert the email application to a previous email application snapshot. For example, the user may have previously instructed the system to delete all emails in the user's inbox (e.g., "delete all emails in me inbox"). The user may later determine that the instruction to delete all the emails in the user's inbox was an error. The user may then send a reversion instruction to the system, where the revision instruction commands the system to undo the delete action and re-populate the inbox with the previously deleted emails (e.g., "display all of the emails that were deleted"). The method may further include, in response to receiving the reversion instruction, reverting, by the one or more processors, the email application to the previous email application snapshot. Upon receiving the reversion instruction, the system may access the stored snapshot in the one or more databases, and then update the email application based on the data in the stored snapshot.

Although FIG. 2 shows example blocks of exemplary method 200, in some implementations, the exemplary method 200 may include additional blocks, fewer blocks, different blocks, or differently arranged blocks than those depicted in FIG. 2. Additionally, or alternatively, two or more of the blocks of the exemplary method 200 may be performed in parallel.

Training a Machine-Learning Model to Process Email Instructions

In some embodiments, the machine-learning model may be trained to predict at least one persona for a user of an email application. More specifically, the machine-learning model may receive at least one training persona, one or more training datasets, and/or one or more training inbox characteristics as training data.

The training datasets may include information corresponding to the user's email application. For example, the training datasets may include email application snapshots that include data such as, email exchanges, folders, email search history, and the like. The email exchanges may include one or more email conversations. The email exchanges may include a sender, a receiver, a time stamp, a subject, email text, and the like. The folders may include one or more email folders that may include email exchanges. The email search history may include one or more search queries performed by a user.

Additionally, or alternatively, the machine-learning model may receive one or more training inbox characteristics. For example, the training inbox characteristics may include at least one marked email, at least one email flag, at least one email amount, at least one inbox setting, or at least one inbox rule. The marked email may include an urgent marking and/or a starred marking on an email exchange. The email flag may include a flag to follow-up on an email. The email amount may include a number of emails in a folder and/or an email inbox. The inbox setting may correspond to a unique user setting and/or user preference of the email interface. Exemplary unique user settings and/or user preference may include unique display settings, reminders, alerts, and the like. The inbox rule may include a filtering/organization rule for emails. For example, an inbox rule may include deleting new emails from a particular sender.

The at least one training persona includes at least one of the personas described in the previous section.

Based on the training datasets and/or the training inbox characteristics, the machine-learning model may analyze the at least one training persona to determine one or more associations between the training datasets and/or the training inbox characteristics and the at least one training persona. The machine-learning model may also use previously learned associations to determine and/or update the associations related to the at least one training persona.

In some embodiments, the machine-learning model may analyze the training datasets and/or the training inbox characteristics to determine at least one persona. The machine-learning model may output the at least one persona. Additionally, in some embodiments, the machine-learning model may also be trained to predict at least one recommended action based on the at least one persona. An exemplary recommended action may include organization recommendations to organize the inbox and/or folders of the email application. The machine-learning model may also output a recommended action in addition to the at least one persona.

Exemplary Device

Figure 3:
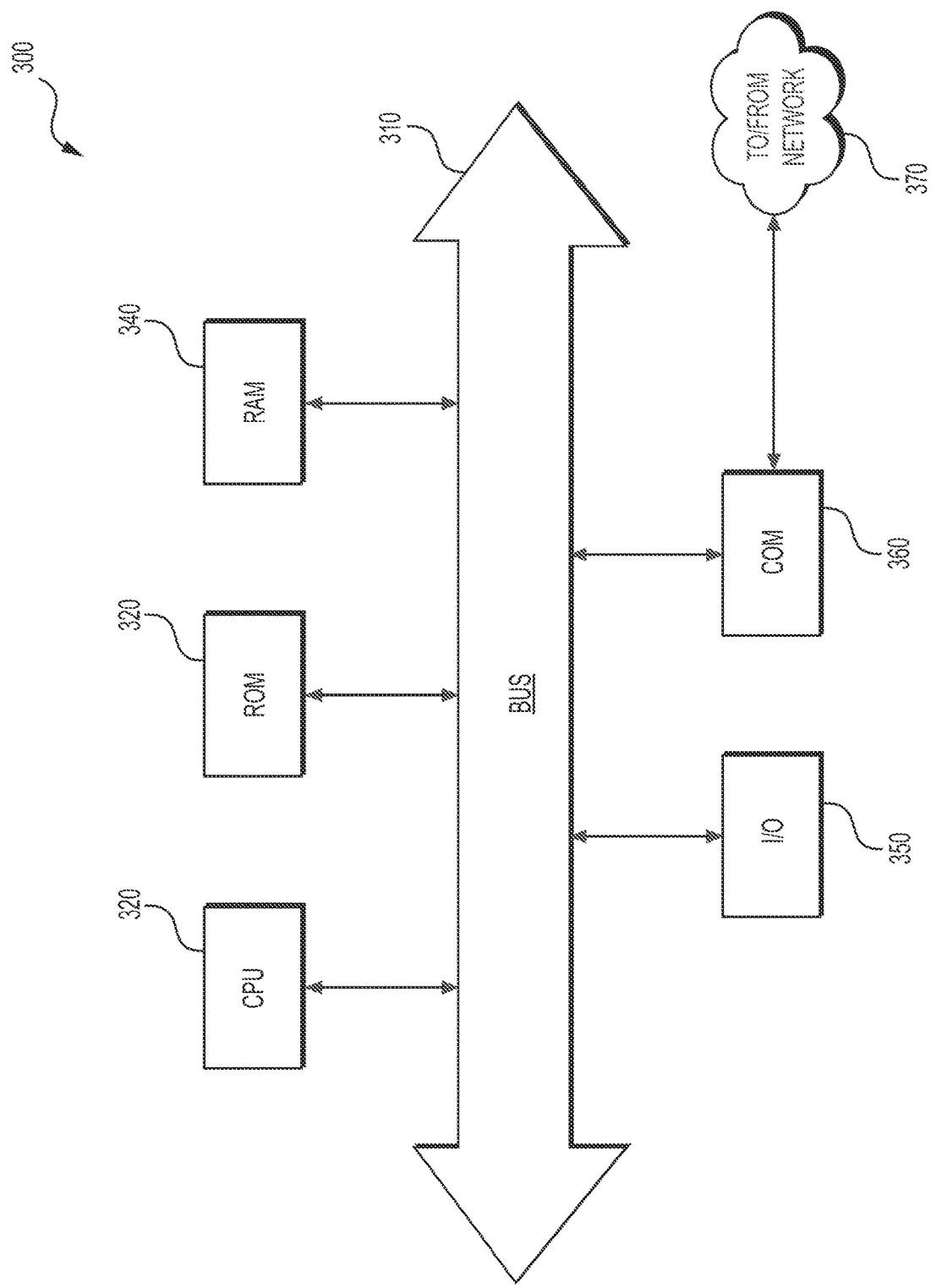
FIG. 3 depicts an example of a computing device that may execute the techniques described herein, according to one or more embodiments.

FIG. 3 is a simplified functional block diagram of a computer 300 that may be configured as a device for executing the method of FIG. 2, according to exemplary embodiments of the present disclosure. For example, device 300 may include a central processing unit (CPU) 320. CPU 320 may be any type of processor device including, for example, any type of special purpose or a general-purpose microprocessor device. As will be appreciated by persons skilled in the relevant art, CPU 320 also may be a single processor in a multi-core/multiprocessor system, such system operating alone, or in a cluster of computing devices operating in a cluster or server farm. CPU 320 may be connected to a data communication infrastructure 310, for example, a bus, message queue, network, or multi-core message-passing scheme.

Device 300 also may include a main memory 340, for example, random access memory (RAM), and also may include a secondary memory 330. Secondary memory 330, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 330 may include other similar means for allowing computer programs or other instructions to be loaded into device 300. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 300.

Device 300 also may include a communications interface ("COM") 360. Communications interface 360 allows software and data to be transferred between device 300 and external devices. Communications interface 360 may include a modem, a network interface (such as an Ethernet card), a communications port, a PCMCIA slot and card, or the like. Software and data transferred via communications interface 360 may be in the form of signals, which may be electronic, electromagnetic, optical, or other signals capable of being received by communications interface 360. These signals may be provided to communications interface 360 via a communications path of device 300, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 300 also may include input and output ports 350 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the general description and the detailed description are exemplary and explanatory only and are not restrictive of the features, as claimed.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for utilizing a machine-learning model to process natural language email instructions, the computer-implemented method comprising:
   receiving, by one or more processors, at least one instruction from a user via an email interface displayed on a user device, the email interface corresponding to an email application;
   processing, by a trained machine-learning model, the at least one instruction to determine at least one response, wherein processing the at least one instruction includes applying at least one persona of the user to the at least one instruction, wherein the trained machine-learning model was previously trained using one or more email datasets and one or more inbox characteristics corresponding to the user to determine the at least one persona corresponding to the user;
   performing, by the one or more processors, at least one action or at least one query corresponding to the at least one response; and
   displaying, by the one or more processors, a confirmation on the email interface of the user device that the at least one response was completed.

2. The computer-implemented method of claim 1, wherein the trained machine-learning model was previously trained using one or more email datasets and one or more inbox characteristics corresponding to the user to determine the at least one persona corresponding to the user.

3. The computer-implemented method of claim 2, wherein the one or more inbox characteristics includes at least one of: at least one marked email, at least one email flag, at least one email amount, at least one inbox setting, or at least one inbox rule.

4. The computer-implemented method of claim 1, wherein the at least one persona includes at least one of: an inbox organizer persona, a minimalist persona, a priority focused persona, a selective reader persona, a delayed responder persona, a batch processor persona, a social engager persona, an inbox ignorer persona, an information hoarder persona, or an unsubscriber persona.

5. The computer-implemented method of claim 1, wherein the at least one instruction includes at least one of: a viewing action, an organizing action, a cleaning action, or a custom action.

6. The computer-implemented method of claim 1, the computer-implemented method further comprising:
   displaying, by the one or more processors, a user feedback widget on the email interface;
   receiving, by the one or more processors, user feedback via the user feedback widget, wherein the user feedback includes a positive feedback indicator, a negative feedback indicator, or a comment; and
   retraining, by the one or more processors, the trained machine-learning model based on the user feedback.

7. The computer-implemented method of claim 1, wherein the at least one instruction includes at least one natural language query.

8. The computer-implemented method of claim 1, the computer-implemented method further comprising:
   analyzing, by the one or more processors, the at least one instruction to determine if the at least one instruction meets or surpasses a severity threshold, wherein the severity threshold includes one or more rules corresponding to an impact of the at least one instruction;
   in response to determining that the at least one instruction meets or surpasses the severity threshold, capturing, by the one or more processors, a snapshot of the email application; and
   storing, by the one or more processors, the snapshot and a corresponding timestamp in one or more databases.

9. The computer-implemented method of claim 1, the computer-implemented method further comprising:
   receiving, by the one or more processors, a reversion instruction to revert the email application to a previous email application snapshot; and
   in response to receiving the reversion instruction, reverting, by the one or more processors, the email application to the previous email application snapshot.

10. A computer system for utilizing a machine-learning model to process natural language email instructions, the computer system comprising:
    a memory having processor-readable instructions stored therein; and
    one or more processors configured to access the memory and execute the processor-readable instructions, which when executed by the one or more processors configures the one or more processors to perform a plurality of functions, including functions for:
       receiving at least one instruction from a user via an email interface displayed on a user device, the email interface corresponding to an email application;
       processing, by a trained machine-learning model, the at least one instruction to determine at least one response, wherein processing the at least one instruction includes applying at least one persona of the user to the at least one instruction, wherein the trained machine-learning model was previously trained using one or more email datasets and one or more inbox characteristics corresponding to the user to determine the at least one persona corresponding to the user;
       performing at least one action or at least one query corresponding to the at least one response; and
       displaying a confirmation on the email interface of the user device that the at least one response was completed.

11. The computer system of claim 10, wherein the trained machine- learning model was previously trained using one or more email datasets and one or more inbox characteristics corresponding to the user to determine the at least one persona corresponding to the user.

12. The computer system of claim 11, wherein the one or more inbox characteristics includes at least one of: at least one marked email, at least one email flag, at least one email amount, at least one folder, or at least one inbox rule.

13. The computer system of claim 10, the functions further comprising:
    displaying a user feedback widget on the email interface;
    receiving user feedback via the user feedback widget, wherein the user feedback includes a positive feedback indicator, a negative feedback indicator, or a comment; and
    retraining the trained machine-learning model based on the user feedback.

14. The computer system of claim 10, the functions further comprising:

analyzing the at least one instruction to determine if the at least one instruction meets or surpasses a severity threshold, wherein the severity threshold includes one or more rules corresponding to an impact of the at least one instruction;

in response to determining that the at least one instruction meets or surpasses the severity threshold, capturing a snapshot of the email application; and storing the snapshot and a corresponding timestamp in one or more databases.

15. The computer system of claim 10, the functions further comprising:

receiving a reversion instruction to revert the email application to a previous email application snapshot; and in response to receiving the reversion instruction, reverting the email application to the previous email application snapshot.

16. A non-transitory computer-readable medium containing instructions for utilizing a machine-learning model to process natural language email instructions, the instructions comprising:

receiving at least one instruction from a user via an email interface displayed on a user device, the email interface corresponding to an email application;

processing, by a trained machine-learning model, the at least one instruction to determine at least one response, wherein processing the at least one instruction includes applying at least one persona of the user to the at least one instruction, wherein the trained machine-learning model was previously trained using one or more email datasets and one or more inbox characteristics corresponding to the user to determine the at least one persona corresponding to the user;

performing at least one action or at least one query corresponding to the at least one response; and displaying a confirmation on the email interface of the user device that the at least one response was completed.

17. The non-transitory computer-readable medium of claim 16, the instructions further comprising:

displaying a user feedback widget on the email interface;

receiving user feedback via the user feedback widget, wherein the user feedback includes a positive feedback indicator, a negative feedback indicator, or a comment; and retraining the trained machine-learning model based on the user feedback.

18. The non-transitory computer-readable medium of claim 16, the instructions further comprising:

analyzing the at least one instruction to determine if the at least one instruction meets or surpasses a severity threshold, wherein the severity threshold includes one or more rules corresponding to an impact of the at least one instruction;

in response to determining that the at least one instruction meets or surpasses the severity threshold, capturing a snapshot of the email application; and storing the snapshot and a corresponding timestamp in one or more databases.

19. The non-transitory computer-readable medium of claim 16, the instructions further comprising:

receiving a reversion instruction to revert the email application to a previous email application snapshot; and in response to receiving the reversion instruction, reverting the email application to the previous email application snapshot.

20. The non-transitory computer-readable medium of claim 16, wherein the at least one action includes at least one of: a viewing action, an organizing action, a cleaning action, or a custom action.

* * * * *